Aug. 14, 1923.
A. DAWER
THIEF TRAP FOR AUTOMOBILES
Filed July 10, 1922
1,464,751
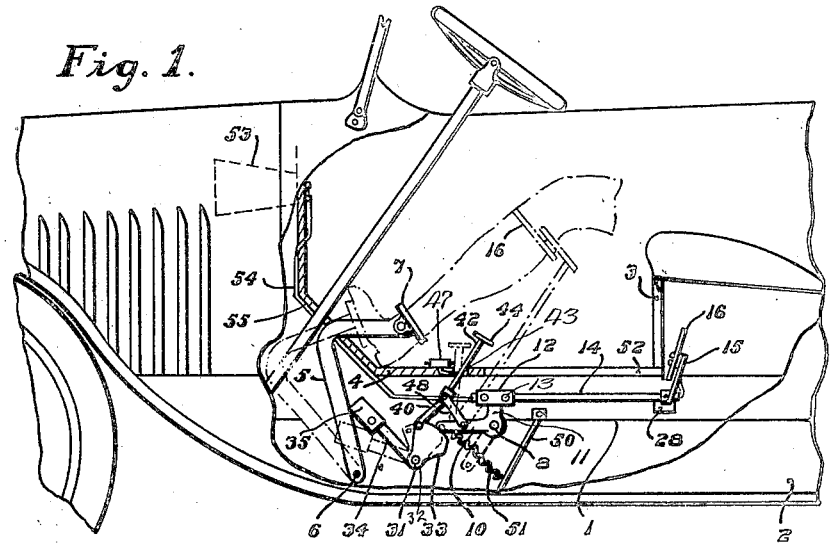
Fig. 1.
Fig. 2.
Fig. 3.
Fig. 4.
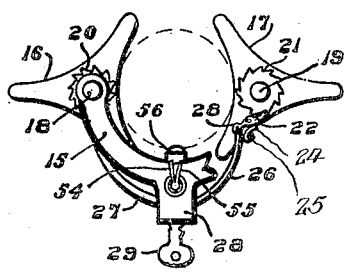
Fig. 5.
Fig. 6.
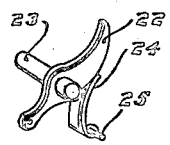
Antonio Dawer
INVENTOR
BY Victor J. Evans
ATTORNEY
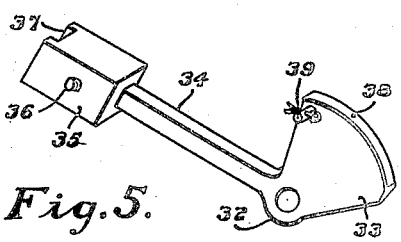

Patented Aug. 14, 1923.

1,464,751

UNITED STATES PATENT OFFICE.

ANTONIO DAWER, OF PHILADELPHIA, PENNSYLVANIA.

THIEF TRAP FOR AUTOMOBILES.

Application filed July 10, 1922. Serial No. 574,107.

*To all whom it may concern:*

Be it known that I, ANTONIO DAWER, a citizen of the United States, residing at Philadelphia, in the county of Philadelphia and State of Pennsylvania, have invented new and useful Improvements in Thief Traps for Automobiles, of which the following is a specification.

This invention relates to auto thief traps and more particularly to a device adapted to trap and hold an auto thief when the operation of the motor car is attempted.

The object of my invention is to provide means in a device of the character referred to which may be automatically actuated upon and by the operation or attempted operation of one of the control levers of a motor vehicle, to trap the operator and prevent his operation of the vehicle or his escape therefrom.

Another object of my invention is to provide means in a device of the character described which when an attempt is made to operate the vehicle will also automatically operate a horn or other signal as a warning that such an attempt has been made and the trap has been released and is holding the operator.

Referring to the drawings, in which like numerals of reference indicate corresponding parts:

Figure 1— is an elevation partly in section and broken away of my device operably mounted on an automobile chassis.

Figure 2— is an enlarged elevation of a controlling plunger and lock therefor disassembled from its co-operating parts.

Figure 3— is a top plan view in detail of the gripping mechanism of my invention disassembled from its cooperating parts.

Figure 4— is a perspective in detail of the adjustable lever which is provided to carry the gripping mechanism shown in Figure 3—.

Figure 5— is a perspective in detail of a weight controlled releasing cam lever disassembled from its co-operating parts.

Figure 6— is a perspective in detail of a spring controlled pawl and its pivotal support which co-operates with a ratchet in my gripping mechanism.

Referring more particularly to the drawings 1 is the frame of the chassis of an automobile carrying an automobile body 2 which is provided with a usual seat and seat frame 3 and a usual floor or bottom 4. To the chassis 1 there is mounted in the usual way a clutch lever 5. This clutch lever 5 is rockably carried on the pivot 6 and extends in the usual way above the flooring 4 and is provided with an actuating foot pedal 7 at its upper end. Also below the flooring 4 there is rockably mounted on the pivot 8 which is carried on the chassis frame 1 the L-shaped lever 9 provided with the arms 10 and 11 extending substantially at right angles to each other. The arm 11 is provided at its upper end with a tubular casing or end member 12 having set screws 13 threaded transversely thereon. The tubular end member 12 is adapted to adjustably receive and carry an arm 14 which is also tubular and which at its free end carries the gripping or locking mechanism of my device.

This gripping or locking mechanism consists of a yoke member 15 of substantially semicircular shape on the opposite open ends of which are rotatably carried the star wheels or locking members 16 and 17. The wheels or locking members are mounted on the pivots 18 and 19 and carry the ratchet wheels 20 and 21 which rotate with the locking members 16 and 17 and are rigidly mounted thereto. Each ratchet wheel is provided with a pawl 22 which, by a pivot 23, is mounted on the opposite arms of the yoke 15 and one end of which is normally held in engagement with the teeth of the ratchet wheels 20 and 21 by the spring 24 likewise mounted on the opposite arms of the yoke 15 by the pins 25. By this means it will be seen that the locking wheels are permitted a rotation but in one direction, namely inwardly toward each other. Rotation in the opposite direction being prevented by the pawls 22 acting as a stop against the teeth of the ratchet wheels 20 and 21. The pawls 22 are also connected at their ends free from the teeth of the ratchet wheels 20 and 21 with the restraining and actuating links 26 and 27 by pivots 28. The opposite ends of the links 26 and 27 extend into the lock 28 which is an integral part of the yoke member 15 and disposed midway its ends.

A key 29 is provided to control the lock 28 so that when the locking members 16 and 17 and the ratchet wheels 20 and 21 are attempted to be turned outwardly to release them from locking position the links 26 and 27 will hold the pawls 22 in engagement with the ratchet wheel and prevent such rotation. The pawls 22 may be released from engagement with the teeth of the ratchet wheels 20 and 21 by the unlocking of the lock 28 by the key 29 and thereby actuating the links 26 and 27 which will turn the pawls 22 upon their pivots 23 and disengage them from the ratchet wheels 20 and 21. The wheels 16 and 17 will then be free to turn in either direction.

It will be seen from the above that any object such as the leg of a person may be entrapped and locked between the wheels 16 and 17 and the opposite ends of the yoke 15 by placing it in engagement with the locking wheels 16 and 17 and turning them towards each other until the leg or other object is securely held between the yoke 15 and the locking wheels 16 and 17 and also that because these wheels 16 and 17 cannot be reversely rotated until the pawls 22 are released from the ratchet wheels 20 and 21 that the leg or other member trapped there between will be securely held thereby, until the key 29 is turned and the lock 28 operated to actuate the links 26 and 27 and release the pawls 22, then the wheels 16 and 17 may be reversely rotated and the leg or other object locked between them may be released.

On the end member 10 of the L shaped lever 9 I provide a roller pin 30 which extends laterally therefrom and acts as a stop or control for the L shaped lever 9 and arm 14 and members carried thereon. To the chassis 1 in cooperative relation with the L shaped lever 9 I rockably mount on the pivot 31 the cam lever 32. This cam lever 32 is provided with a segmental shaped cam 33 and a controlling or actuating lever 34 carrying an actuating weight 35 which is slidably adjustable along the length of the lever 34 and is locked in fixed position of adjustment thereon by means of the set screw 36 or other suitable locking means. This weight 35 at its outer end is provided with a recessed portion 37 which is adapted to engage and contact with an arm of the foot gage actuated control lever 5. This engagement of the weight 35 with the lever 5 is provided so that when the lever 5 is in normal inoperative elevated position as shown in full lines in Fig. 1, the lever 34 will be held in an elevated position and will thereby hold the segmental cam 33 in a rearwardly disposed position, so that the roller pin 30 on the end member 10 of the lever 9 will be engaged and be controlled by the face 38 of the segmental cam 33 and thereby hold the arm 14 and locking mechanism carried on the free end thereof in a depressed or restrained position below the floor boarding 4 and seat frame 3 as shown in full lines in Figure 1.

To the segmental cam 33 or a laterally projecting pivot pin 39 thereon I rockably connect one end of a link member 40 and similarly connect its other end to an enlargement 41 at the lower end of a plunger 42, which extends therefrom upwardly above the flooring 4 through an opening 43 therein. At the upper end of the plunger I provide a knob or enlargement 44 by which the plunger may be manually or otherwise operated for a purpose later to be explained. Intermediate its ends I provide the plunger 42 with a notch or cut in portion 45 which is adapted to be engaged by a tongue or stop 46 which is controlled by a lock mechanism 47 carried on and above the flooring 4. This lock mechanism 47 is adapted to engage an arm of the tongue 46 and control it against movement when the tongue 46 has engaged the slot 45 in the plunger 42, and to lock this tongue 46 therein, to thereby restrain and lock the plunger 42 against movement, or when the lock mechanism 47 is unlocked to permit the tongue 46 to be withdrawn from the slot 45 and thus leave the plunger free to be actuated when and as desired.

To the enlarged end 41 of the plunger 42 I also pivotally mount a link member 48, the other end of which is likewise pivotally mounted at 49 to the arm 10 of the L shaped lever 9. It will be seen from this that the plunger 42 is so connected by the links 40 and 48 to the segmental cam 33 and the arm 10 of the L shaped lever 9 that when the parts are in normal inoperative restrained position as shown in Fig. 1, that the plunger will be in an elevated position and that if the tongue 46 is inserted and locked in engagement with the slot 45 therein, the parts will be held thereby against operation and the trap will not operate when any intended or desired operation of the clutch lever 5 takes place. Also when the tongue 46 is unlocked by the lock 47 and is withdrawn from the notch or slot 45 in the plunger 42, (which is done when the operator leaves the car and has the thief trap set for operation), then the parts of the device are free to operate in the intended way to catch and hold a person attempting to operate the car.

To the chassis body 1 I mount a bracket or arm 50 to which I connect one end of a spring 51 the other end of which is connected to the arm 10 of the L shaped lever 9 at a point intermediate its end and its pivotal point. This spring is provided to actuate the L shaped lever 9 and to draw its member 10 downwardly and thereby throw the arm 14 and locking and gripping means on the end thereof upwardly and forwardly when the lever 9 is released for operation. This releasing occurs when the clutch lever 5 is pressed downwardly. This causes the weight 35 to carry the cam lever arm 34 downwardly and rock the cam 33 forwardly upon its pivot until the roller 30 on the lever arm 10 is no longer in engagement with the edge 38 of this cam and is therefore no longer restrained against movement by the spring 51. When so released this movement takes place and the arm 14 and members carried thereon are swung forwardly and upwardly through an aperture on slot 52 provided in the flooring 4 and the seat frame 3, for its passage therethrough. Presuming that this release takes place as the result of an operator placing his foot upon the clutch lever pedal 7, as shown in dotted lines in Fig. 1, his leg is positioned as there shown. When the arm 14 is then released and swung forward the star wheels 16 and 17 strike the leg and turn inwardly toward each other, thus gripping it on either side, while the back of the leg is encased and held in and between the arms of the yoke member 15. The leg of the operator is thus locked against release therefrom because the star wheels 16 and 17 are held against outward turning by the stop ratchet pawls 22 and cannot be freed therefrom until the lock 28 is operated by the key 29 and the link members 26 and 27 are thereby operated to take the pawls 22 from engagement with the ratchet wheels 20 and 21; after which the star wheels 16 and 17 can be rotated outwardly and the leg freed from their grip.

Connected to the electrically operated horn 53, mounted on the automobile body, are the conductors 54 and 55, which pass through the flooring 4 and through the tubular arm 14 to a push button or circuit closing contact 56. This contact button 56 is carried on the yoke 15, centrally positioned on its inner edge in such a manner that when the leg of the operator is locked between the yoke 15 and the star wheels 16 and 17 it will press upon the contact button 56 and by thus closing the circuit will cause the horn to sound a warning that the trap has operated and an attempt has been made to operate the automobile. The continued pressure of the operator's leg causes the horn to continue sounding until the leg has been released from the yoke 15.

It will be seen from the forgoing that an operator may lock the trap in restrained position by locking the plunger 42 as before described. The car may be then operated as desired without actuating the thief trap. If the operator removes his foot from the clutch lever 5 and unlocks the plunger 42, the trap is then in condition to be actuated if an operator places his foot upon the clutch lever 5. The arm 14 and gripping mechanism thereon will then and thereby be thrown forwardly and the leg of the operator locked within the yoke 15 and the resultant sounding of the horn will take place and continue until the leg is released.

It will thus be seen that I have provided a device of simple construction, positive in action and of great efficiency for the purposes intended by which thefts of automobiles may be prevented and at the same time the capture of the intended thief secured.

Although I have shown one specific form of the embodiment of my invention yet I do not wish to be limited thereby for it is obvious that modifications in the constructive operation and arrangement of parts may be made without departing from the spirit and scope of my invention.

Having thus described my invention what I claim as new and desire to secure by Letters Patent is:—

1. In a motor vehicle the combination of a clutch lever, lever actuated means adapted to be projected upwardly upon and by the operation of said clutch lever, rotatable means carried by said first mentioned means adapted to lockably grip the leg of the operator and prevent the further operation of said clutch lever and means carried upon said first mentioned means to operate a warning sound signal simultaneously with the operation of the lever actuated means.

2. In a motor vehicle the combination of a clutch lever, a cam lever actuated by said clutch lever, a spring actuated arm controlled by said cam lever, rotatable gripping means carried by said arm adapted to lockably grip the leg of an operator upon the operation of said clutch lever and means adapted to lock said cam lever and arm against operation independently of the operation of said clutch lever.

3. In a motor vehicle the combination of a clutch lever, a cam lever actuated by said clutch lever, a spring actuated arm controlled by said cam lever, rotatable gripping means carried by said arm adapted to lockably grip the leg of an operator upon the operation of said clutch lever, ratchet and pawl means for controlling said gripping means, and means adapted to lock said cam lever and arm against operation independently of the operation of said clutch lever.

4. In a motor vehicle the combination of a clutch lever, a cam lever actuated by said clutch lever, a spring actuated arm controlled by said cam lever, rotatable gripping means carried by said arm adapted to lockably grip the leg of an operator upon the operation of said clutch lever, ratchet and pawl means for controlling said gripping means, key operated means for controlling said ratchet and pawl means, and means adapted to lock said cam lever and arm against operation independently of the operation of said clutch lever.

In testimony whereof I affix my signature.

ANTONIO DAWER.